(12) United States Patent
Iwasaki et al.

(10) Patent No.: US 11,799,804 B2
(45) Date of Patent: Oct. 24, 2023

(54) CHAT BOT CONTROL DEVICE, CHAT BOT CONTROL METHOD, AND CHAT BOT CONTROL DEVICE SYSTEM

(71) Applicant: Hitachi Systems, Ltd., Tokyo (JP)

(72) Inventors: Shinya Iwasaki, Tokyo (JP); Ken Iikura, Tokyo (JP); Michiori Yoshitake, Tokyo (JP); Natsuki Ohta, Tokyo (JP); Hiroto Fukushima, Tokyo (JP); Nobuo Kudo, Tokyo (JP); Yoshimitsu Toyoba, Tokyo (JP); Naoya Tsumura, Tokyo (JP); Tomoharu Ichihara, Tokyo (JP)

(73) Assignee: Hitachi Systems, Ltd., Tokyo (JP)

( * ) Notice: Subject to any disclaimer, the term of this patent is extended or adjusted under 35 U.S.C. 154(b) by 0 days.

(21) Appl. No.: 17/793,898

(22) PCT Filed: Sep. 3, 2020

(86) PCT No.: PCT/JP2020/033387
§ 371 (c)(1),
(2) Date: Jul. 19, 2022

(87) PCT Pub. No.: WO2021/149296
PCT Pub. Date: Jul. 29, 2021

(65) Prior Publication Data
US 2023/0132894 A1 May 4, 2023

(30) Foreign Application Priority Data
Jan. 24, 2020 (JP) .................. 2020-010185

(51) Int. Cl.
*H04L 51/02* (2022.01)
*H04L 51/046* (2022.01)

(52) U.S. Cl.
CPC ............ *H04L 51/02* (2013.01); *H04L 51/046* (2013.01)

(58) Field of Classification Search
CPC ....... H04L 51/02; H04L 51/07; H04L 51/046; H04L 51/04; H04L 12/1813; H04L 41/5093
See application file for complete search history.

(56) References Cited

U.S. PATENT DOCUMENTS 8,818,926 B2 * 8/2014 Wallace .............. G06F 16/3329
706/45
10,742,814 B1 * 8/2020 Bell ....................... H04L 67/141
(Continued)

FOREIGN PATENT DOCUMENTS

JP 2018-142054 A 9/2018
JP 2019-049900 A 3/2019

OTHER PUBLICATIONS

International Search Report for corresponding Application No. PCT/JP2020/033387, dated Nov. 17, 2020.
(Continued)

*Primary Examiner* — Sargon N Nano
(74) *Attorney, Agent, or Firm* — Renner, Otto, Boisselle & Sklar, LLP

(57) ABSTRACT

A chat bot capable of seamlessly acquiring, in response to user input in a chat session, information necessary for an appropriate chat scenario for assisting the user from an external system and dynamically generating a chat scenario. Accordingly, the chat bot control device includes an external data acquisition unit for acquiring, in a chat session between a user and a chat bot, chat scenario creation data for generating a chat scenario from a predetermined external system based on a first input from the user; a scenario generation unit for generating, based on the chat scenario creation data, a first chat scenario that specifies transitions of
(Continued)

a dialogue between the user and the chat bot using predetermined scenario conversion logic that defines a chat scenario generation pattern; and a scenario execution unit for executing the first chat scenario in the chat session.

10 Claims, 12 Drawing Sheets

(56) References Cited

U.S. PATENT DOCUMENTS

| | | | |
|---|---|---|---|
| 2018/0150739 A1* | 5/2018 | Wu | G06N 20/10 |
| 2018/0174020 A1* | 6/2018 | Wu | G06N 3/08 |
| 2018/0196796 A1* | 7/2018 | Wu | G06F 40/289 |
| 2018/0203851 A1* | 7/2018 | Wu | G06N 3/006 |
| 2018/0324116 A1* | 11/2018 | Vaduva | G06F 3/0482 |
| 2019/0079709 A1 | 3/2019 | Tokuchi | |
| 2021/0224858 A1* | 7/2021 | Khoury | G06Q 30/0267 |
| 2022/0358539 A1* | 11/2022 | Bozhin | G06Q 30/0254 |
| 2022/0405808 A1* | 12/2022 | Khoury | G06Q 30/0203 |

OTHER PUBLICATIONS

Written Opinion for corresponding Application No. PCT/JP2020/033387, dated Nov. 17, 2020.

* cited by examiner

```
{
  "modules": [
    {
      "id": "m02-01",
      "module": "ChoicePrompt",
      "args": [
        "'m02-01'"
      ]
    },
    {
      "id": "m02-02",
      "module": "TextPrompt",
      "args": [
        "'m02-02'"
      ]
    }
  ]
```
Module Unit (Definition of used parts) — 420

```
  "slots": {
    "age": {
      "entity": "number"
    }
  }
```
Slot Unit (Definition for state-saving) — 440

```
  "steps": [
    {
      "stepId": "sci02-01",
      "type": "Prompt",
      "promptText": "`Please enter your age.`",
      "slot": "age",
      "transitions": [
        {
          "destId": "sci02-02",
          "rule": "lastValue>=20"
        },
        {
          "destId": "sci02-03"
        }
      ]
    },
    {
      "stepId": "sci02-02",
      "type": "Prompt",
      "promptText": "`age: ${stateValues['sci02-01']} `",
      "transitions": [
        {
          "destId": "sci02-04"
        }
      ]
    },
  ]
}
```
Step Unit (Definition of Events, Transitions) — 460

FIG. 5
500
demo-sc:main_scenario
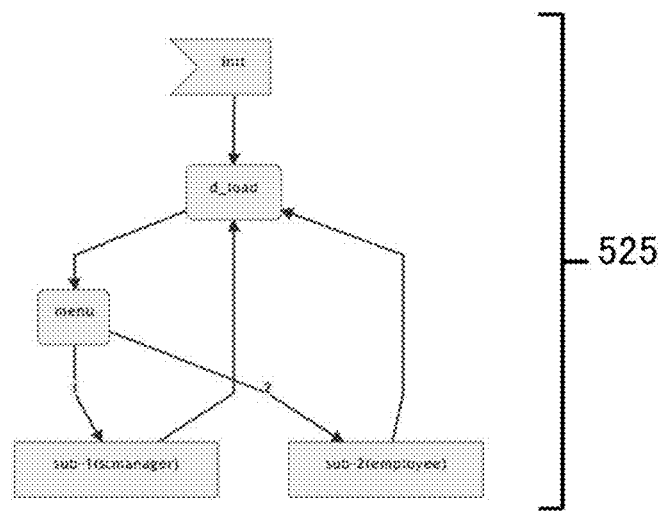
525
demo-sc:sub-1(scmanager)
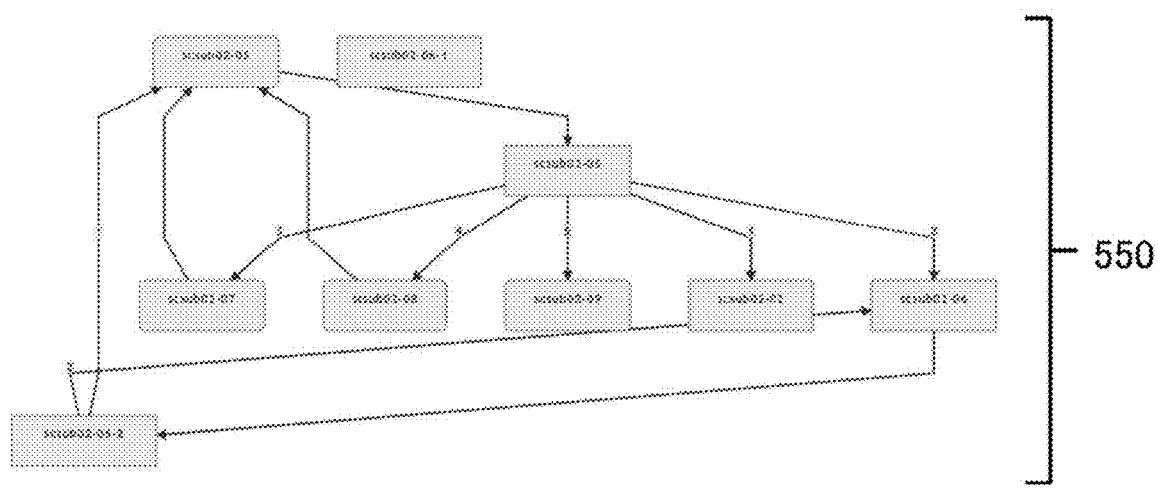
550

CHAT BOT CONTROL DEVICE, CHAT BOT CONTROL METHOD, AND CHAT BOT CONTROL DEVICE SYSTEM

TECHNICAL FIELD

The present invention relates to a chat bot control device, a chat bot control method, and a chat bot control device system.

BACKGROUND OF THE INVENTION

With the spread of messaging services such as chat and social networking services (SNS) that exchange messages between users, chat bots, which run on these messaging services and automatically conduct conversations through text and voice, have become popular.

Chat bots operate to detect a particular word or phrase from a message entered by a user and to output a pre-prepared response corresponding to the specific word or phrase. Some chat bots are operated by messenger service accounts assigned for advertising or commercial use of companies or stores, and users can use various services through the exchange of natural messages and perform predetermined tasks with the support of chat bots.

As an example, Patent Document 1 describes a technique in which "A development support system 1 includes: an information storage unit for storing a plurality of first information 220 that respectively defines meta information for a plurality of design information 240, second information 230 that defines the relationships between the plurality of first information, and third information 320 that defines a template of a dialogue component prepared for a task to be commonly performed with the plurality of design information; a dialogue scenario information generation unit 310 for generating, based on each of the first information, the second information, and the third information, a dialogue component 330 for each task of each design information and dialogue scenario information 340 for each task unit based on each design information; and a dialogue scenario information processing unit 311 for operating a chat device 4 based on each dialogue component and each dialogue scenario information."

CITATION LIST

Patent Literature

[Patent Document 1] JP 2018-142054

SUMMARY OF INVENTION

Technical Problem

In the above-mentioned Patent Document 1, in system development, a technique is described for supporting system development work of a user by generating dialogue components for each task of design information related to development and dialogue scenario information for each task unit based on each design information, and operating a chat device based on each dialogue component and each dialogue scenario information.

However, in the technique described in Patent Document 1, it is necessary to generate a chat scenario for coordinating with various external systems that store the information requested by the user to generate a chat scenario for smoothly facilitating the flow of dialogue between the user and the chat bot. Additionally, for this purpose, it is necessary to create a unique control device (program) for each use case.

Meanwhile, as the demand for SNS and API coordination has increased in recent years, there is demand for quickly deploying chat bot-based services.

As an example, it is conceivable to support recruiting activities through chat bots. In this case, a user who is looking for a job uses a chat bot to conduct a hearing (review of his/her personal history), and users who pass the hearing are introduced to companies that are recruiting personnel. For example, in the case that a company has a large number of stores and recruits personnel who satisfy different conditions (predetermined qualifications, work schedule, and predetermined language ability) for each store, in order to conduct hearings with candidates, it is necessary to prepare in advance as many chat scenarios as the product of the number of stores and the number of conditions. In addition, whenever the store's recruiting circumstances or conditions change, the created chat scenarios need to be updated for the new circumstances and conditions. Applying traditional chat bots to such cases would require enormous development resources and manpower to create and maintain a large number of chat scenarios.

Accordingly, it is an object of the present invention to provide a chat bot capable of seamlessly obtaining, in response to user input in a chat session, information necessary for an appropriate chat scenario for dealing with the user and dynamically generating a chat scenario.

Solution to Problem

In order to solve the above-mentioned problems, one representative chat bot control device according to the present invention includes an external data acquisition unit for acquiring, in a chat session between a user and a chat bot, chat scenario creation data for generating a chat scenario from a predetermined external system based on a first input from the user; a scenario generation unit for generating, based on the chat scenario creation data, a first chat scenario that specifies a transition of a dialogue between the user and the chat bot using predetermined scenario conversion logic that defines a chat scenario generation pattern; and a scenario execution unit for executing the first chat scenario in the chat session.

Advantageous Effects of Invention

According to the present invention, it is possible to provide a chat bot capable of seamlessly obtaining, in response to user input in a chat session, information necessary for an appropriate chat scenario for dealing with the user and dynamically generating a chat scenario.

BRIEF DESCRIPTION OF DRAWINGS

FIG. 4 is a diagram illustrating an example of a definition structure for defining the operation of a chat session according to the embodiments of the present invention.

FIG. 5 is a diagram illustrating an example of a nested structure of a chat session according to the embodiments of the present invention.

DESCRIPTION OF EMBODIMENT(S)

Figure 1:
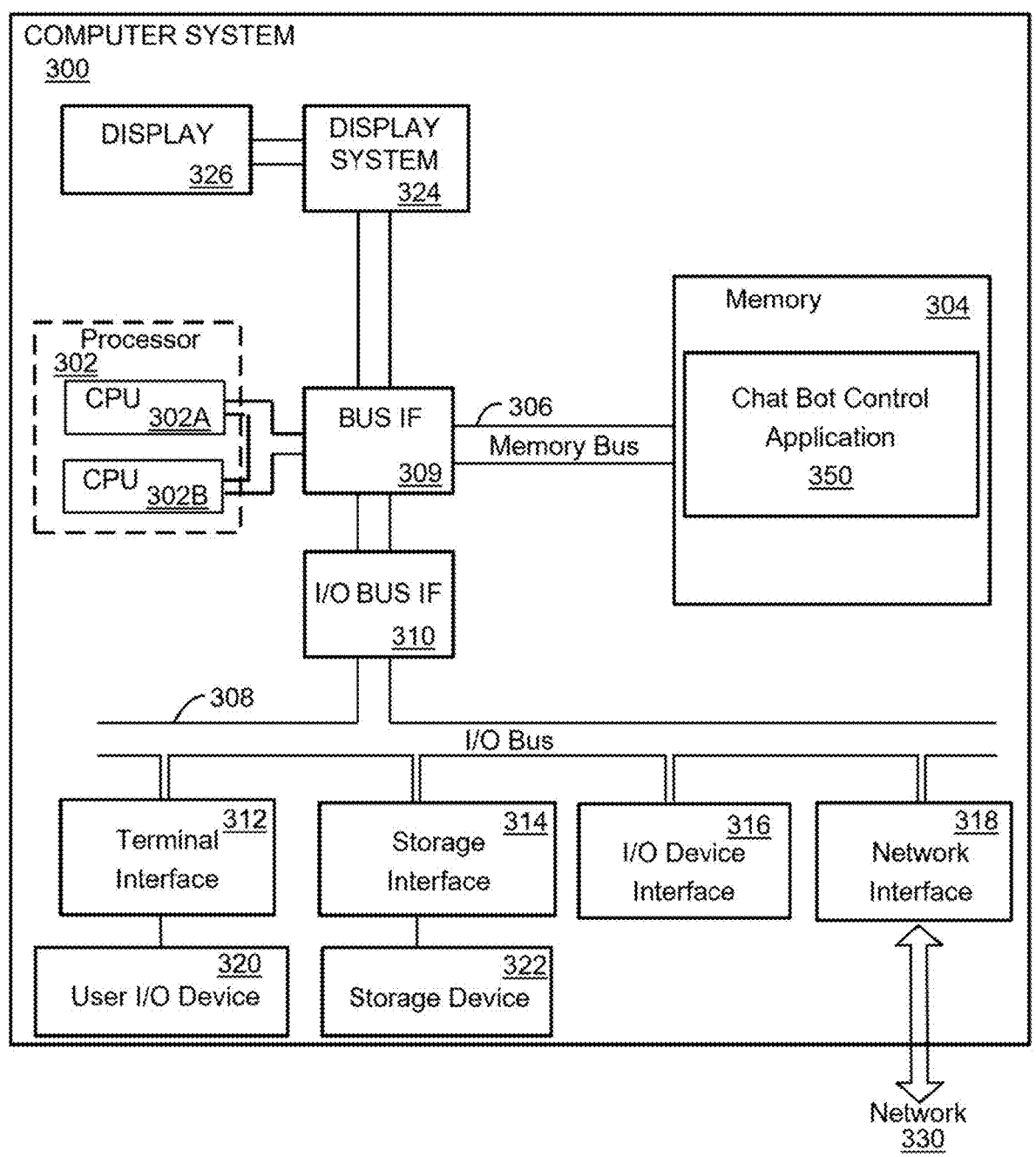
FIG. 1 is a diagram illustrating a computer system for carrying out the embodiments of the present invention.

Hereinafter, a conventional example and the embodiments of the present invention will be described with reference to the drawings. It should be noted that the present invention is not limited by these embodiments. In addition, in the description of the drawings, the same components are denoted by the same reference numerals.

(Hardware Configuration)

Referring first to FIG. 1, a computer system 300 for implementing the embodiments of the present disclosure will be described. The mechanisms and devices of the various embodiments disclosed herein may be applied to any suitable computing system. The main components of the computer system 300 include one or more processors 302, a memory 304, a terminal interface 312, a storage interface 314, an I/O (Input/Output) device interface 316, and a network interface 318. These components may be interconnected via a memory bus 306, an I/O bus 308, a bus interface unit 309, and an I/O bus interface unit 310.

The computer system 300 may include one or more general purpose programmable central processing units (CPUs), 302A and 302B, herein collectively referred to as the processor 302. In some embodiments, the computer system 300 may contain multiple processors, and in other embodiments, the computer system 300 may be a single CPU system. Each processor 302 executes instructions stored in the memory 304 and may include an on-board cache.

In some embodiments, the memory 304 may include a random access semiconductor memory, storage device, or storage medium (either volatile or non-volatile) for storing data and programs. The memory 304 may store all or a part of the programs, modules, and data structures that perform the functions described herein. For example, the memory 304 may store a chat bot control application 350. In some embodiments, the chat bot control application 350 may include instructions or statements that execute the functions described below on the processor 302.

In some embodiments, the chat bot control application 350 may be implemented in hardware via semiconductor devices, chips, logic gates, circuits, circuit cards, and/or other physical hardware devices in lieu of, or in addition to processor-based systems. In some embodiments, the chat bot control application 350 may include data other than instructions or statements. In some embodiments, a camera, sensor, or other data input device (not shown) may be provided to communicate directly with the bus interface unit 309, the processor 302, or other hardware of the computer system 300.

The computer system 300 may include a bus interface unit 309 for communicating between the processor 302, the memory 304, a display system 324, and the I/O bus interface unit 310. The I/O bus interface unit 310 may be coupled with the I/O bus 308 for transferring data to and from the various I/O units. The I/O bus interface unit 310 may communicate with a plurality of I/O interface units 312, 314, 316, and 318, also known as I/O processors (IOPs) or I/O adapters (IOAs), via the I/O bus 308.

The display system 324 may include a display controller, a display memory, or both. The display controller may provide video, audio, or both types of data to the display device 326. Further, the computer system 300 may also include a device, such as one or more sensors, configured to collect data and provide the data to the processor 302.

For example, the computer system 300 may include biometric sensors that collect heart rate data, stress level data, and the like, environmental sensors that collect humidity data, temperature data, pressure data, and the like, and motion sensors that collect acceleration data, movement data, and the like. Other types of sensors may be used. The display system 324 may be connected to a display device 326, such as a single display screen, television, tablet, or portable device.

The I/O interface unit is capable of communicating with a variety of storage and I/O devices. For example, the terminal interface unit 312 supports the attachment of a user I/O device 320, which may include user output devices such as a video display device, a speaker, a television or the like, and user input devices such as a keyboard, mouse, keypad, touchpad, trackball, buttons, light pens, or other pointing devices or the like. A user may use the user interface to operate the user input device to input data and instructions to the user I/O device 320 and the computer system 300 and receive output data from the computer system 300. The user interface may be presented via the user I/O device 320, such as displayed on a display device, played via a speaker, or printed via a printer.

The storage interface 314 supports the attachment of one or more disk drives or direct access storage devices 322 (which are typically magnetic disk drive storage devices, but may be arrays of disk drives or other storage devices configured to appear as a single disk drive). In some embodiments, the storage device 322 may be implemented as any secondary storage device. The contents of the memory 304 are stored in the storage device 322 and may be read from the storage device 322 as needed. The I/O device interface 316 may provide an interface to other I/O devices such as printers, fax machines, and the like. The network interface 318 may provide a communication path so that computer system 300 and other devices can communicate with each other. The communication path may be, for example, the network 330.

In some embodiments, the computer system 300 may be a multi-user mainframe computer system, a single user system, or a server computer or the like that has no direct user interface and receives requests from other computer systems (clients). In other embodiments, the computer system 300 may be a desktop computer, a portable computer, a notebook computer, a tablet computer, a pocket computer, a telephone, a smart phone, or any other suitable electronic device.

Next, a chat bot control system according to the present invention will be described with reference to FIG. 2.

Figure 2:
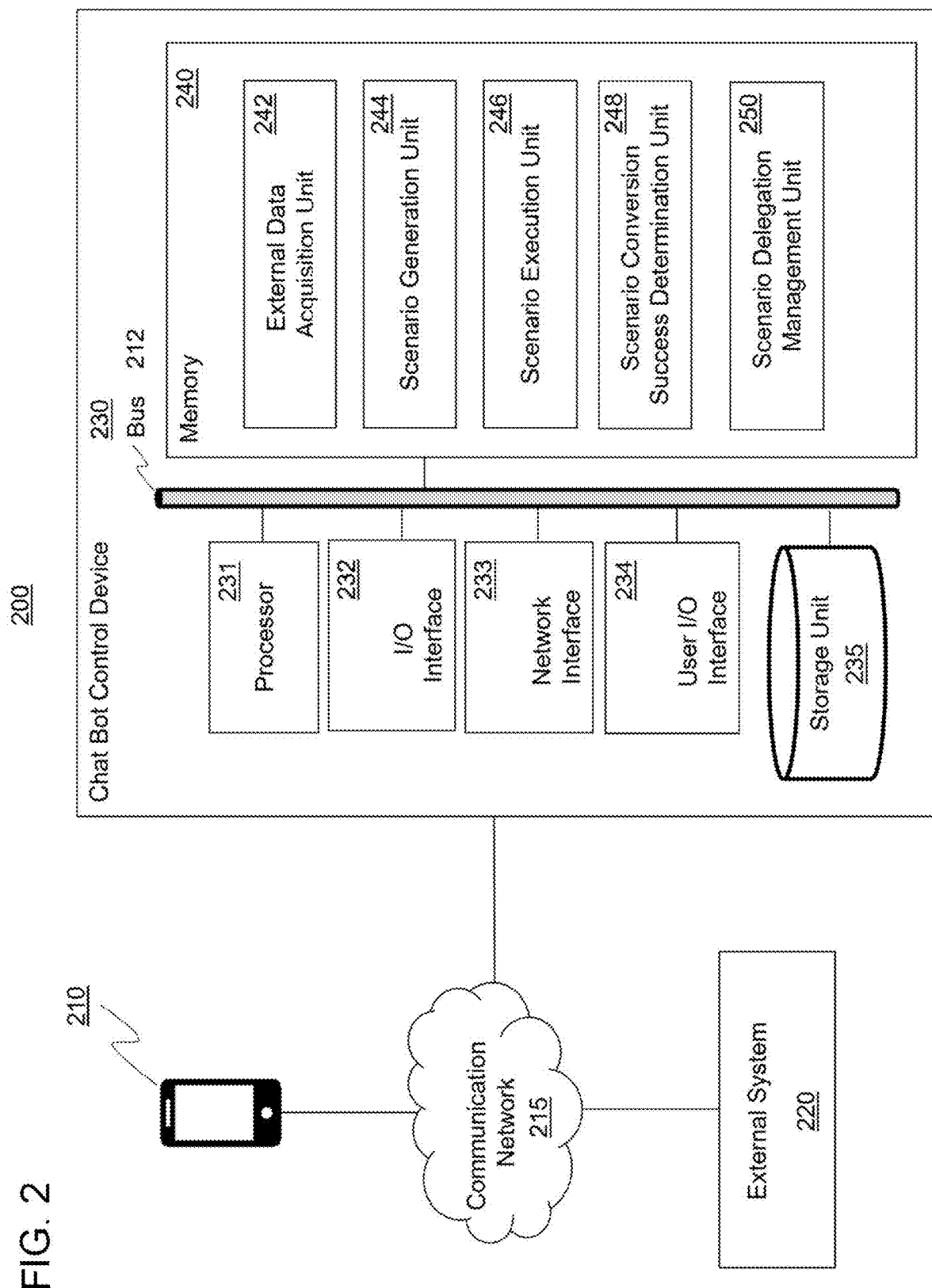
FIG. 2 is a diagram illustrating an example of a configuration of a chat bot control system according to the embodiments of the present invention.

FIG. 2 is a diagram illustrating an example of the configuration of a chat bot control system 200 according to the present invention. As illustrated in FIG. 2, the chat bot control system 200 according to the present invention primarily includes a mobile device 210, a communication network 215, an external system 220, and a chat bot control device 230. The mobile device 210, the external system 220, and the chat bot control device 230 are connected via a communication network 215.

The communication network 215 may include, for example, a local area network (LAN), a wide area network (WAN), a satellite network, a cable network, a Wi-Fi network, or any combination thereof. In addition, the connection between the external system 220 and the chat bot control device 230 may be wired or wireless.

The mobile device 210 is a device used by an individual user, and may be, for example, a personal computer, a mobile device such as a smart phone, a tablet personal computer, or the like. The user may use a predetermined communication application (SNS, mail, message function) or a browser of the mobile device 210 to have a dialogue (exchange messages or the like) with the chat bot provided by the chat bot control device 230 via the communication network 215. For example, a user can receive a desired service by having a dialogue with any chat bot, such as a travel guidance chat bot, a restaurant reservation chat bot, a personnel recruitment chat bot, or the like via an SNS application installed on the mobile device 210.

The external system 220 is a system for storing chat scenario creation data for generating chat scenarios. The external system 220 may be, for example, a system composed of a remote personal computer, server, storage device, database, cloud storage, or a combination thereof. Although one external system 220 is illustrated in FIG. 2 for convenience of description, in reality, the chat bot control device 230 is connected to a large number of external systems, and can access a necessary external system according to the content and purpose of the chat scenario to acquire desired chat scenario creation data.

The external system 220 may store different data depending on the purpose of use. For example, in the case of a restaurant reservation, the external system 220 may store a list of restaurants within a predetermined area and information such as the specialty dishes, price range, business hours, current reservation status, or the like for each restaurant. As another example, in the case of personnel recruitment, the external system 220 may store, for example, a list of stores that are recruiting personnel, and information specifying conditions (the number of personnel, qualification, and workable days) of the personnel that each store is recruiting. The information stored in the external system 220 serves as the chat scenario creation data to be described later.

The chat bot control device 230 is a computing device for executing the chat bot control technique according to the present invention. The chat bot control device 230 may be, for example, a desktop computer, a server computer, a laptop computer, a tablet computer, a workstation, a mobile device, or other type of computing devices, and is not specifically limited in the present invention.

As illustrated in FIG. 2, the chat bot control device 230 includes a processor 231 for executing instructions stored in a memory 240, an I/O interface 232 for controlling communication between the internal and external devices of chat bot control device 230, a network interface 233 for controlling communication via a communication network 215, a user I/O interface 234 for receiving input from a user, a memory 240 for storing the functional units for performing the respective functions of the chat bot control technique according to the embodiments of the present invention, and a bus 212 for controlling bilateral communication of these components.

As illustrated in FIG. 2, the memory 240 includes, for example, an external data acquisition unit 242 for acquiring, in a chat session between a user and a chat bot, chat scenario creation data for generating a chat scenario from a predetermined external system 220 based on a first input from the user, a scenario generation unit 244 for generating, based on the chat scenario creation data, a first chat scenario that specifies a transition of a dialogue between the user and the chat bot using predetermined scenario conversion logic that defines a chat scenario generation pattern, a scenario execution unit 246 for executing the first chat scenario in the chat session, a scenario conversion success determination unit 248 for determining whether or not chat scenario generation has succeeded, and a scenario delegation management unit 250 for managing delegation of a specific chat scenario included in the chat session to the external system.

It should be noted that each functional unit included in the chat bot control device 230 may be a software module that constitutes the chat bot control application 350 in the computer system 300 illustrated in FIG. 1, or may be an independent dedicated hardware device. In addition, the above-described functional units may be implemented in the same computing environment or may be implemented in a distributed computing environment. For example, the external data acquisition unit 242 that acquires chat scenario creation data from the external system 220 and the scenario generation unit 244 that generates the first chat scenario may be implemented in the chat bot control device 230, and the other functional units may be implemented in a remote server.

According to the configuration described above, an appropriate chat scenario for assisting a user interacting with a chat bot via a communication network can be dynamically generated based on information acquired from an external system.

Next, the logical structure of a chat bot according to the embodiments of the present invention will be described with reference to FIG. 3.

Figure 3:
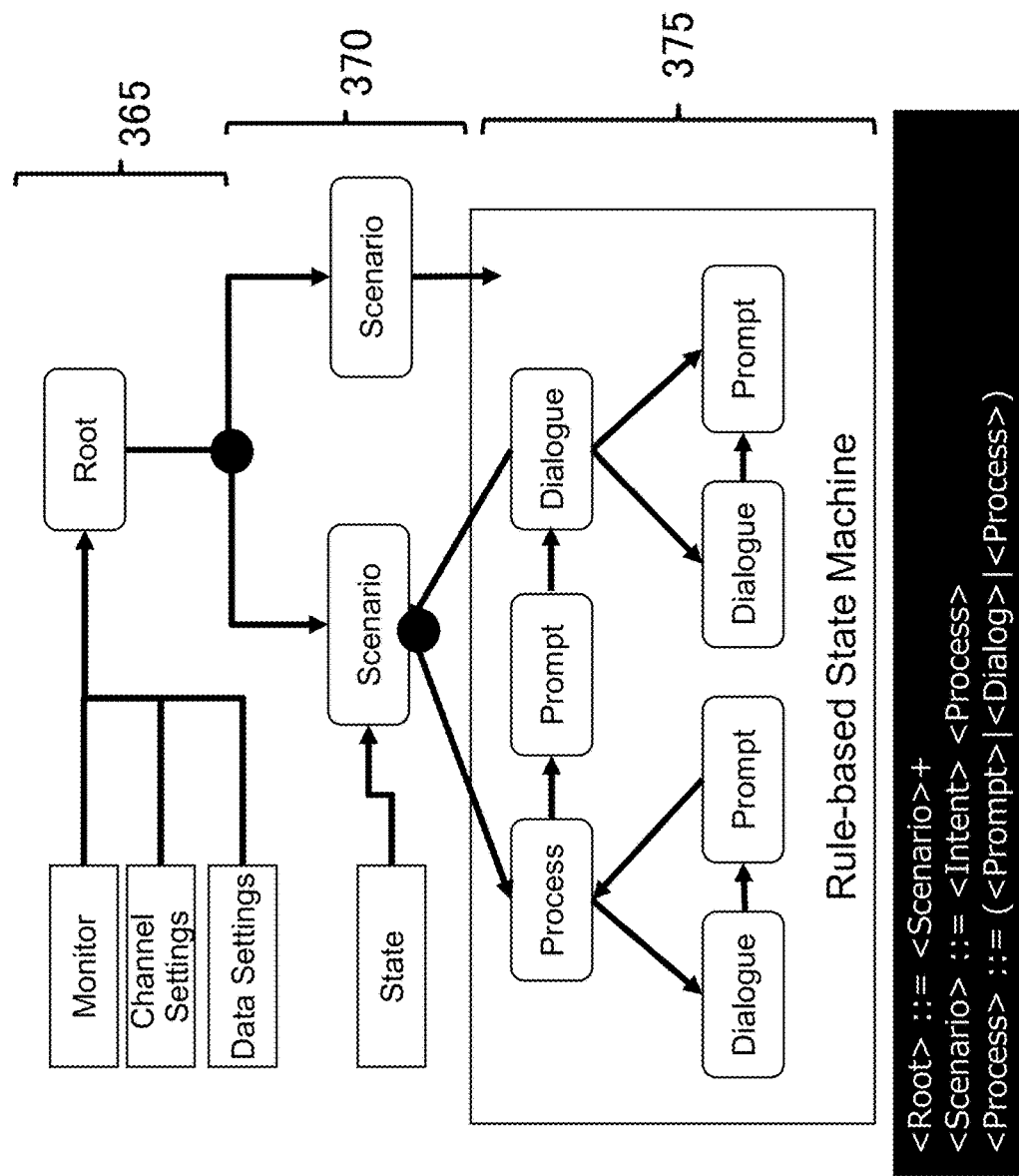
FIG. 3 is a diagram illustrating an example of the logical structure of a chat bot according to the embodiments of the present invention.

FIG. 3 is a diagram illustrating an example of the logical structure 360 of a chat bot according to the embodiments of the present invention. As illustrated in FIG. 3, the chat bot according to the present embodiment includes three layers: root control 365, scenario control 370, and process control 375. By means of the control of these three layers, it is possible to manage chat scenarios in chat sessions between users and chat bots as well as the transitions of processing within the scenarios.

Root control 365 controls the selection of a chat scenario to be deployed in a chat session from among a plurality of chat scenarios. Root control 365 determines the user's intention (what information or service the user desires) by, for example, processing the dialogue with the user using a predetermined natural language processing technique or intent analysis technique. Root control 365 then compares the determined user intent to a plurality of (for example, pre-prepared) chat scenarios to select and execute a scenario that satisfies a predetermined similarity criterion.

It should be noted that, if another scenario is already running, root control 365 may insert an interrupt and migrate to the newly selected scenario, or may execute the newly selected scenario after the already running scenario has completed.

Scenario control 370 controls the transition of events within a chat scenario. Scenario control 370 performs each event (activity, prompt, or the like) in an executing scenario according to a scenario definition structure that defines the transitions of the scenario. In addition, the transitions of the scenario here proceed according to data (vectors) that record the information of the dialogue between the user and the chat bot as a numerical value. For example, in the case that it is determined that the dialogue between the user and the chat bot matches a predetermined state, scenario control 370 may execute appropriate event processing in accordance with this state.

Process control 375 controls the processing of events within a chat scenario and is a logical framework (interface) for a particular task or unit of operation within a scenario. Process control 375 may, for example, determine the next event or execute the processing of an activity in the scenario based on the dialogue state of a dialogue entered by the user with respect to a particular prompt.

Next, a definition structure that defines the operation of a chat session according to the embodiments of the present invention will be described with reference to FIG. 4.

FIG. 4 is a diagram illustrating an example of a definition structure 400 that defines the operation of a chat session according to the embodiments of the present invention. The definition structure 400 according to the embodiments of the present invention is a data structure that defines the transitions, (that is, the flow) of a chat session in a chat session. In the present invention, definition structures corresponding to a plurality of different use cases (facility reservation, restaurant reservation, airport check-in, personnel recruitment, or the like) are prepared in advance and stored in a storage unit (for example, the storage unit 235 illustrated in FIG. 2). Then, as will be described later, when the chat scenario creation data is acquired from an external system (for example, the external system 220 illustrated in FIG. 2), the acquired chat scenario creation data can be converted into a definition structure (a second definition structure) by performing processing using a definition structure (a first definition structure) corresponding to the chat scenario creation data. Subsequently, by executing this definition structure as a program, it is possible to dynamically generate a chat scenario based on the acquired chat scenario creation data. In other words, the definition structure 400 is information specifying how to convert the scenario creation data into a scenario.

As illustrated in FIG. 4, the definition structure 400 includes a module unit 420, a slot unit 440, and a step unit 460.

The module unit 420 functions as a function for specifying which program is to be used in a scenario. For example, the module unit 420 may specify a program that defines dialogues, utterances, prompts, activities, dialogue branch points, and the like to be used in the scenario.

The slot unit 440 defines a storage destination for storing information acquired in a chat session. The information acquired in the chat session is, for example, information entered by a user interacting with the chat bot, and is different for each use case of the chat session. These pieces of information may be configured as the dialogue state described above.

In the case of a personnel recruitment chat scenario, this information may include information regarding the name entered by the user, the work desired, or information about personal history, and in the case of a restaurant reservation, this information may include a food dish desired by the user, a time frame, an area, or the like It should be noted that, in general, the storage destination defined in the slot unit 440 is a memory area in the network storage, but it is also possible to store the information acquired in the chat session in a local storage device.

The step unit 460 defines events in the chat scenario and defines transitions in the chat scenario one by one. The events defined by the step unit 460 include types such as prompts, activities, scripts, and sub-scenarios. A prompt is a scenario event that provides an utterance to the user and waits for a reply from the user (for example, "What is your name?"). An activity is a scenario event that provides an utterance to the user and continues to the next process without waiting for a reply (for example, "Certainly. I'll search for a store."). A script is a scenario event that invokes a given function (such as accessing an external system or searching the Internet). A sub-scenario is a process for calling a sub-scenario, which is a new secondary scenario within a main scenario that is already being executed (for example, a process of determining the content of a course meal in a main scenario of restaurant reservation).

In addition, although not illustrated in FIG. 4, the definition structure 400 specifies rules defining the behavior of a chat scenario. These rules may, for example, define in which slot the information acquired from the user is to be stored, or specify which chat event (prompt, script, or the like) is to be transitioned to next according to the dialogue state stored in the slot.

As described above, the chat session between the user and the chat bot is defined by the module unit 420, the slot unit 440, and the step unit 460, and the chat rules included in the definition structure, and the flow of the dialogue is controlled.

Next, a nested structure of a chat session according to the embodiments of the present invention will be described with reference to FIG. 5.

FIG. 5 is a diagram illustrating an example of a nested structure of a chat session according to the embodiments of the present invention. As described above, in the chat bot control according to the embodiments of the present invention, a chat session with a nested structure is possible. Here, the nested structure means that the scenarios in a chat session are repeated recursively. More specifically, the chat scenario according to the invention includes a main scenario, which is a static scenario called at startup, and a sub-scenario, which is any number of follow-up scenarios called within the main scenario.

For example, as illustrated in FIG. 5, when a chat session is started, a main scenario 525 that controls the basic behavior of the session is called and executed (for example, based on the definition structure). The main scenario 525 includes a plurality of scenario events, such as prompts, dialogues, activities, scripts, and the like, for example that define the transitions of the dialogue with the user. In the case that it is determined that the dialogue state of the dialogue with the user matches a predetermined dialogue state, the chat bot calls and executes a sub-scenario 550 in the main scenario, in accordance with the dialogue state.

Further, the number of sub-scenarios called here is not limited to one, and multiple sub-scenarios may be called simultaneously and executed in parallel. When the called sub-scenario ends, the chat session returns to the main scenario.

As an example, when a chat session is started, a main scenario for determining the user's intent (what kind of service or the like is desired) may be called. In this main scenario, in the case that the dialogue between the user and the chat bot progresses and it is determined that the user wishes to make a restaurant reservation, a sub-scenario dedicated to restaurant reservation may be called. In this sub-scenario, information on what kind of dish, price range, or area the user desires may be acquired by a plurality of chat events, (prompts or the like), and a process of reserving a restaurant may be performed. After that, upon completion of the process, this sub-scenario may be terminated and the chat session may return to the main scenario.

In this way, by using a nested structure in which sub-scenarios related to a plurality of different use cases can be called within one main scenario, it is possible to flexibly respond to the various needs of the user.

Next, a chat session control method according to the embodiments of the present invention will be described with reference to FIG. 6.

Figure 6:
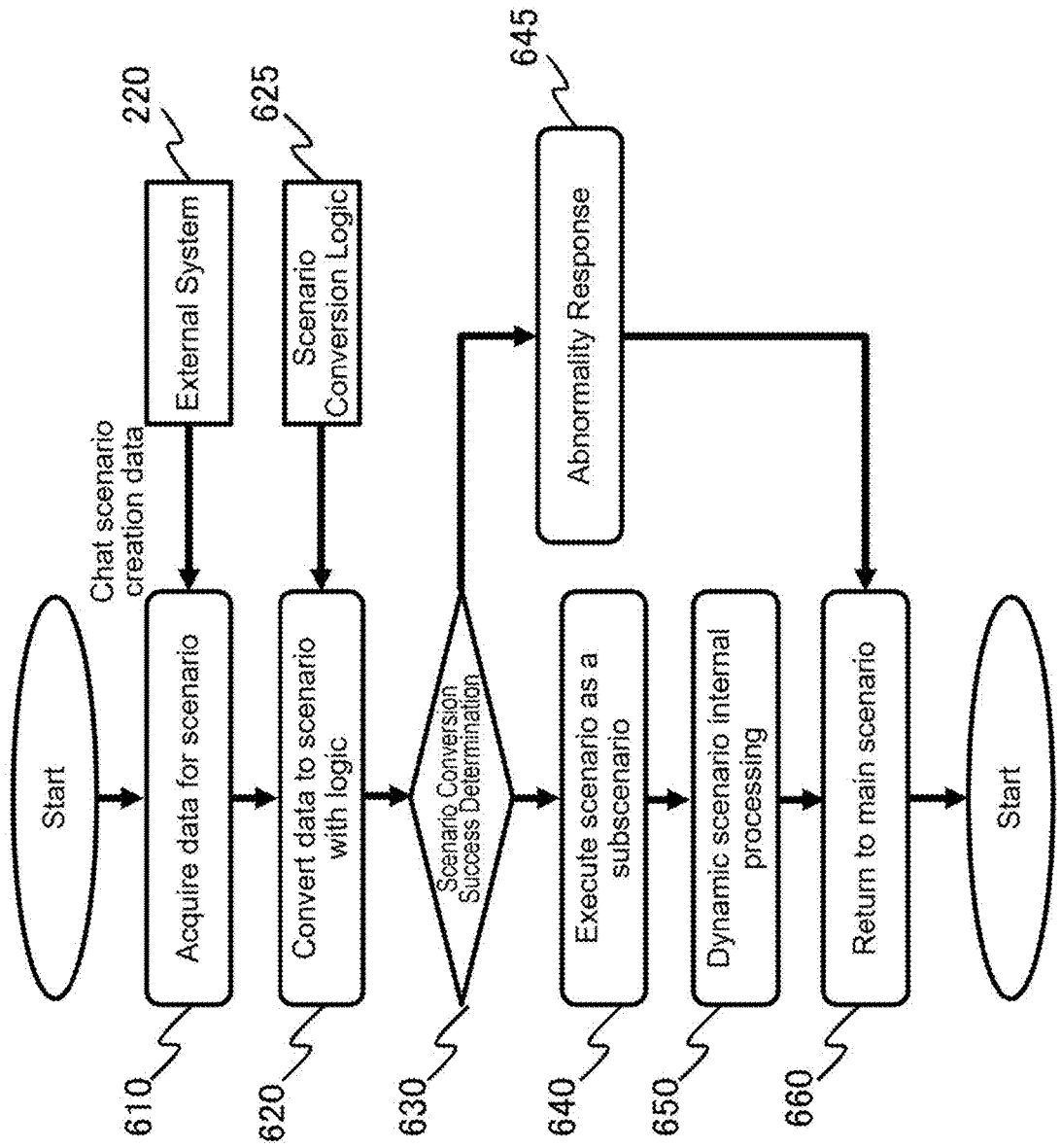
FIG. 6 is a diagram illustrating the flow of a chat session control method according to the embodiments of the present invention.

FIG. 6 is a flowchart illustrating the flow of a chat session control method 600 according to the embodiments of the present invention. As described above, the chat session control method 600 is a process for seamlessly acquiring, in response to a user input in a chat session, information necessary for an appropriate chat scenario for assisting the user from an external system and dynamically generating a chat scenario, and may be performed by the chat bot control device 230 illustrated in FIG. 2, for example.

First, in Step 610, chat scenario creation data is acquired from a predetermined external system 220. The acquisition of the chat scenario creation data may be performed by, for example, the above-described external data acquisition unit (for example, the external data acquisition unit 242 illustrated in FIG. 2). In addition, the acquisition of the chat scenario creation data here may be performed based on a first input from a user in the chat session. The first input may be, for example, a response to a prompt presented by the chat bot to the user in the chat scenario (the main scenario), or may include a case in which it is determined that the dialogue state with the user satisfies a similarity criterion with respect to a predetermined dialogue state. In addition, the determination as to which chat scenario creation data is to be acquired from which external system 220 may be performed based on the first input.

As an example, in the chat scenario, in the case that a first input of "I'm looking for a Japanese-style restaurant" is detected from the user, the external data acquisition unit may request access to an external system 220 that stores information about reservable restaurants and acquire information about Japanese-style restaurants that can be reserved using a predetermined Application Programming Interface (API) or Robotics Process Automation (RPA) technique.

It should be noted that RPA is a program for acting on behalf of or automating a predetermined task or process. In the present invention, by using RPA, arbitrary processing such as acquisition of data from an external system, scenario registration, and the like can be performed more efficiently without human intervention.

Next, in Step 620, a chat scenario (for example, a first chat scenario) is generated from the chat scenario creation data acquired in Step 610 using predetermined scenario conversion logic 625. This chat scenario generation may be performed by, for example, the above-described scenario generation unit (for example, the scenario generation unit 244 illustrated in FIG. 2). The scenario conversion logic 625 defines how the chat scenario creation data acquired from the external system 220 is used to generate a chat scenario, and specifies one of a plurality of generation patterns based on the characteristics of the acquired chat scenario creation data or the like. The scenario conversion logic 625 may be stored in the storage unit 235 illustrated in FIG. 2, for example, or may be defined as a module in the main scenario.

It should be noted that the chat scenario generation by the scenario conversion logic 625 will be described in detail later.

Next, in Step 630, it is determined whether or not the chat scenario has been successfully generated. The chat scenario conversion success determination may be performed by, for example, the scenario conversion success determination unit described above (for example, the scenario conversion success determination unit 248 illustrated in FIG. 2). More specifically, the chat scenario conversion success determination compares the chat scenario (for example, the first chat scenario) generated in Step 620 with success determination data specifying the definition structure corresponding to the chat bot control device, and in the case that the chat scenario satisfies a predetermined similarity criterion with respect to the success determination data, it is determined that the generation of the chat scenario has been successful, and the chat scenario is transferred to the execution unit. The comparison between the chat scenario and the definition structure may be performed by what is known as structure analysis or a comparison of regular expressions.

It should be noted that, as a result of comparing the chat scenario generated in Step 620 to the success determination data, in the case that the chat scenario does not satisfy the predetermined similarity criterion with respect to the success determination data, the present process proceeds to Step 645. In Step 645, it is determined that the generation of the chat scenario has not succeeded, and an error message indicating that the generation has not succeeded is provided to a predetermined notification destination (for example, a chat bot administrator).

Next, in Step 640, in the case that it is determined that the generation of the chat scenario generated in Step 620 is successful, the chat scenario is executed as a sub-scenario in the main scenario that is already being executed. Execution of the sub-scenario herein may use the nested structure described above. That is, in the main scenario, the chat scenario may be called and executed as a sub-scenario.

Next, in Step 650, the processing in the chat scenario executed in Step 640 is sequentially executed. Here, for example, prompts, activities, scripts, and the like in the chat scenario are performed, and the dialogue between the user and the chat bot proceeds according to the transition rules defined in the chat scenario.

It should be noted that further sub-scenarios may be called in the chat scenario being executed as this sub-scenario. For example, in the dialogue between a user and a chat bot in a sub-scenario, in the case that additional data is required from an external system, the process of acquiring this necessary data from the predetermined external system may be performed as a further sub-scenario, or the scenario delegation process described below may be performed as a further sub-scenario.

Next, in Step 660, when the processing of the chat scenario, which is the sub-scenario executed in Steps 640 to 650, is completed, the processing of the chat session returns to the main session and the processing of the main scenario proceeds.

It should be noted that if more sub-scenarios are running in this sub-scenario, the chat session processing returns to the parent scenario of the sub-scenario in which processing completed, rather than the main scenario.

In this way, by acquiring chat scenario creation data from a predetermined external system based on the user's input, dynamically generating a chat scenario based on the chat scenario creation data, and executing the chat scenario, it is possible to provide chat scenarios based on the latest data in real time, users can be assisted more flexibly and efficiently.

Next, a chat scenario generation process 700 according to the embodiments of the present invention will be described with reference to FIG. 7 to FIG. 9. As described above, the chat scenarios according to the embodiments of the present invention are generated using predetermined scenario conversion logic. In addition, this scenario conversion logic defines how to generate a chat scenario using the chat scenario creation data acquired from an external system, and specifies one of a plurality of generation patterns based on the characteristics of the acquired chat scenario creation data.

Figure 7:
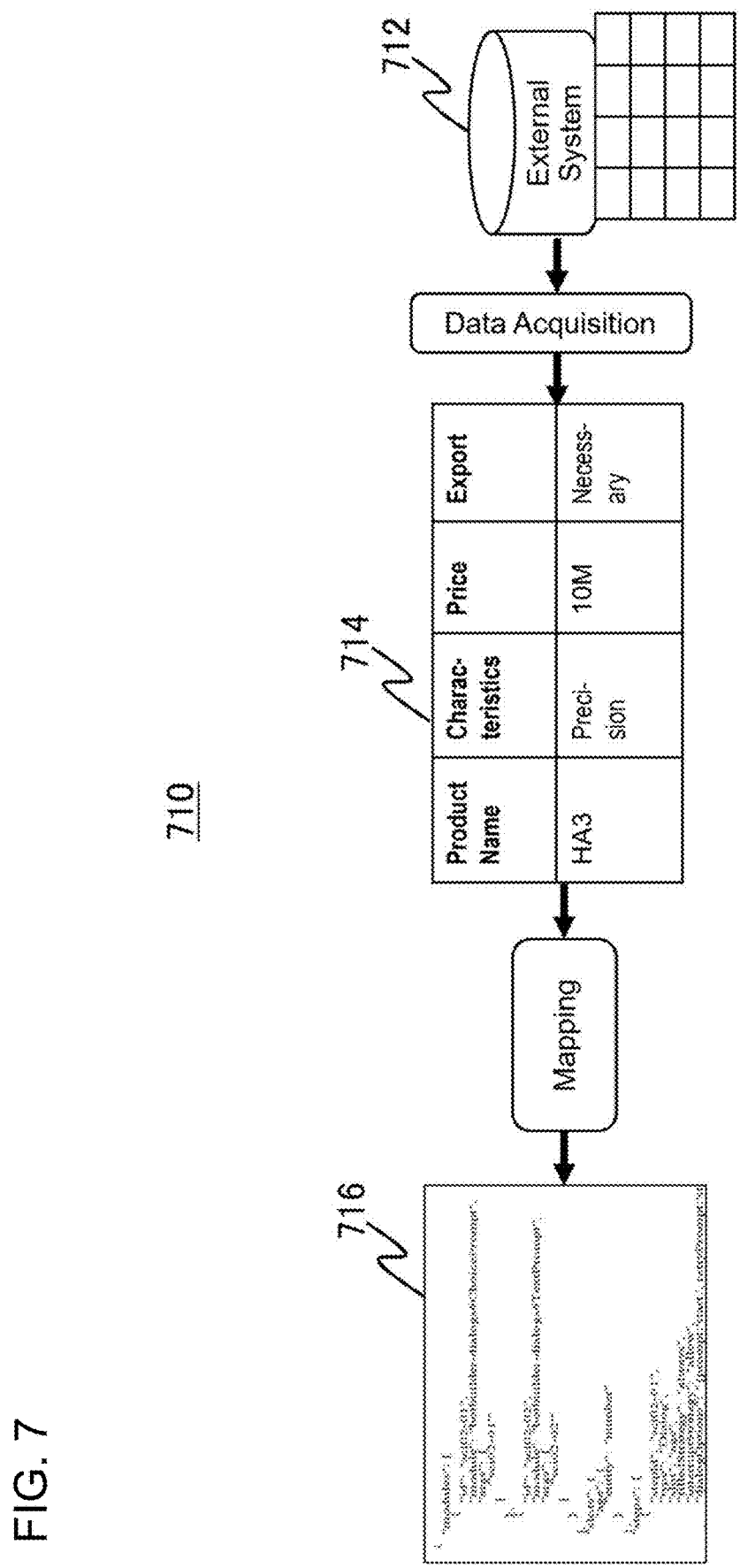
FIG. 7 is a diagram illustrating a first generation pattern of the scenario conversion logic in the chat scenario generation process according to the embodiments of the present invention.

FIG. 7 is a diagram illustrating a first generation pattern 710 of the scenario conversion logic in the chat scenario generation process according to the embodiments of the present invention. In the first generation pattern 710 illustrated in FIG. 7, first, as described above, in a chat session between a user and a chat bot, the external data acquisition unit, (for example, the external data acquisition unit 242 illustrated in FIG. 2) acquires chat scenario creation data 714 from a predetermined external system 712 for generating a chat scenario based on a first input from the user. For example, as illustrated in FIG. 7, the chat scenario creation data 714 may be information regarding a specific product (such as a product name, a characteristic, a price, an export necessity or the like).

Next, after the chat scenario creation data 714 is acquired, the scenario generation unit (for example, the scenario generation unit 244 illustrated in FIG. 2) may generate a chat scenario by mapping the acquired chat scenario creation data 714 to a definition structure 716 prepared in advance. This definition structure 716 may, for example, be a structure prepared in advance and selected from a plurality of definition structures corresponding to different use cases in accordance with the use case (for example, a product order) of the acquired chat scenario creation data 714.

It should be noted that here, mapping means inserting items included in the acquired chat scenario creation data 714 (such as a product name, a characteristic, a price, and an export necessity) into a corresponding location in the definition structure 716, for example.

In this way, by mapping the chat scenario creation data acquired from the external system to a definition structure prepared in advance, it is possible to dynamically generate a chat scenario based on the chat scenario creation data.

Figure 8:
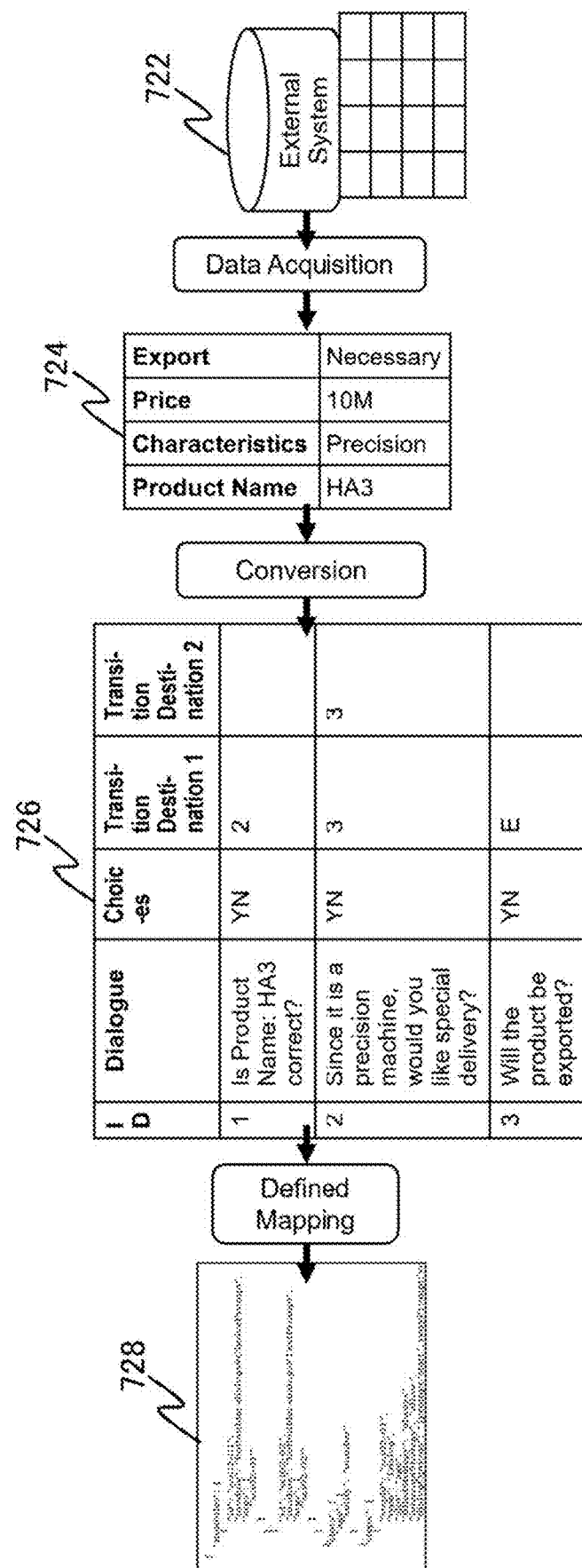
FIG. 8 is a diagram illustrating a second generation pattern of the scenario conversion logic in the chat scenario generation process according to the embodiments of the present invention.

FIG. 8 is a diagram illustrating a second generation pattern 720 of the scenario conversion logic in the chat scenario generation process according to the embodiments of the present invention. In the second generation pattern 720 illustrated in FIG. 8, first, as described above, in a chat session between a user and a chat bot, the external data acquisition unit, (for example, the external data acquisition unit 242 illustrated in FIG. 2) acquires chat scenario creation data 724 from a predetermined external system 722 for generating a chat scenario based on a first input from the user. For example, as illustrated in FIG. 8, the chat scenario creation data 724 may be information regarding a specific product (such as a product name, a characteristic, a price, an export necessity or the like).

Next, after the chat scenario creation data 724 is acquired, the scenario generation unit (for example, the scenario generation unit 244 illustrated in FIG. 2) may convert the acquired chat scenario creation data 724 into a chat scenario based on a predetermined format 726 prepared in advance. This predetermined format may, for example, define a rule that designates a transition from a particular dialogue state to a subsequent dialogue state.

As an example, as illustrated in FIG. 8, the predetermined format 726 may specify a choice of items in the chat scenario creation data 724 (for example, a user's answer of YES or NO to confirm the model number, characteristics, and export necessity or the like of a product) and a rule defining the next transition destination according to each respective choice. The chat scenario creation data 724 can be reconfigured based on the transition rules defined in this predetermined format 726 to easily generate a chat scenario.

In one aspect of the embodiments of the present invention, this predetermined format 726 is obtained from the external system 722 along with the chat scenario creation data 724. In this case, this predetermined format 726 may be an automatic telephone exchange script that defines the transitions of a dialogue (for example, a script configured to indicate "Press 1 for inquiries about bill payment, press 2 for inquiries about cancellation . . . " or the like).

It should be noted that the predetermined format 726 according to the present invention is not necessarily limited to one stored in advance in the external system 722, and may be generated by a neural network or the like trained using past dialogue information as learning data, or may be created by a chat bot administrator or the like.

In this way, by converting the chat scenario creation data 724 based on the transition rules defined in the predetermined format 726, it is possible to dynamically generate a chat scenario based on the latest information of the external system 722 even in cases that there is no pre-created definition structure, for example.

Figure 9:
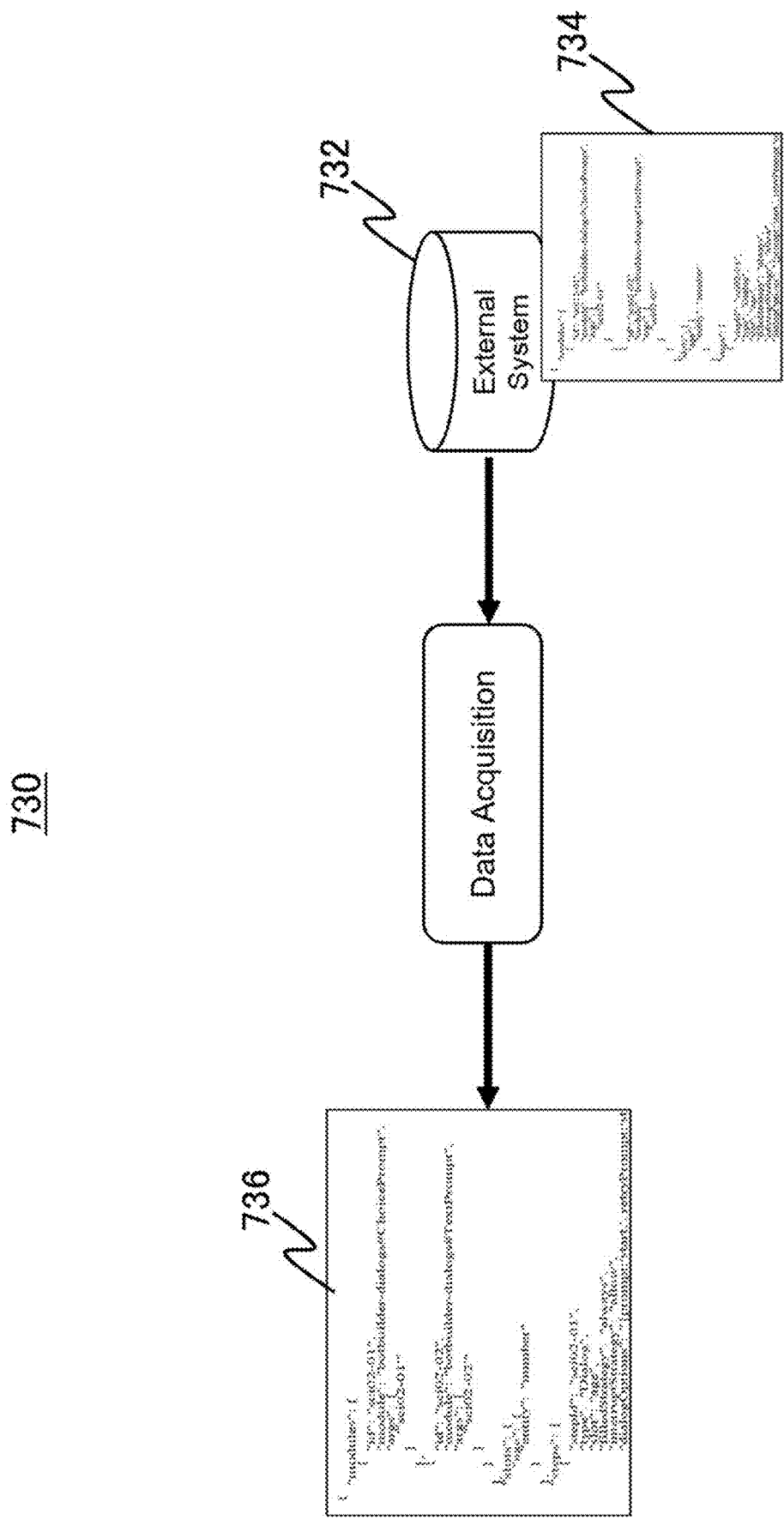
FIG. 9 is a diagram illustrating a third generation pattern of the scenario conversion logic in the chat scenario generation process according to the embodiments of the present invention.

FIG. 9 is a diagram illustrating a third generation pattern 730 of the scenario conversion logic in the chat scenario generation process according to the embodiments of the present invention. In the third generation pattern 730 illustrated in FIG. 9, it is assumed that the chat scenario creation data for generating the chat scenario is already in the format of the chat scenario definition structure and is stored in the external system 722 as the chat scenario 734. This applies in cases in which the external system employs an API or the like for storing information to be stored as chat scenarios, or cases in which the chat scenarios generated by the chat scenario generation process according to the embodiments of the present invention are stored in the external system.

In this case, since the information to be provided in the chat session between the user and the chat bot is already in the chat scenario format, the external data acquisition unit (for example, the external data acquisition unit 242 illustrated in FIG. 2) acquires the chat scenario 734 based on the first input from the user in the chat session between the user and the chat bot. Subsequently, as described above, the acquired chat scenario 734 may be executed as a sub-scenario in the main scenario that is being executed in the chat session.

In this way, since the information to be provided in the chat session between the user and the chat bot is already in the chat scenario format, chat scenarios based on the latest state of the external system can be directly embedded in the chat session without the use of pre-generated definition structures or predetermined formats.

Next, a chat session control delegation process according to an embodiment of the present invention will be described with reference to FIG. 10.

Figure 10:
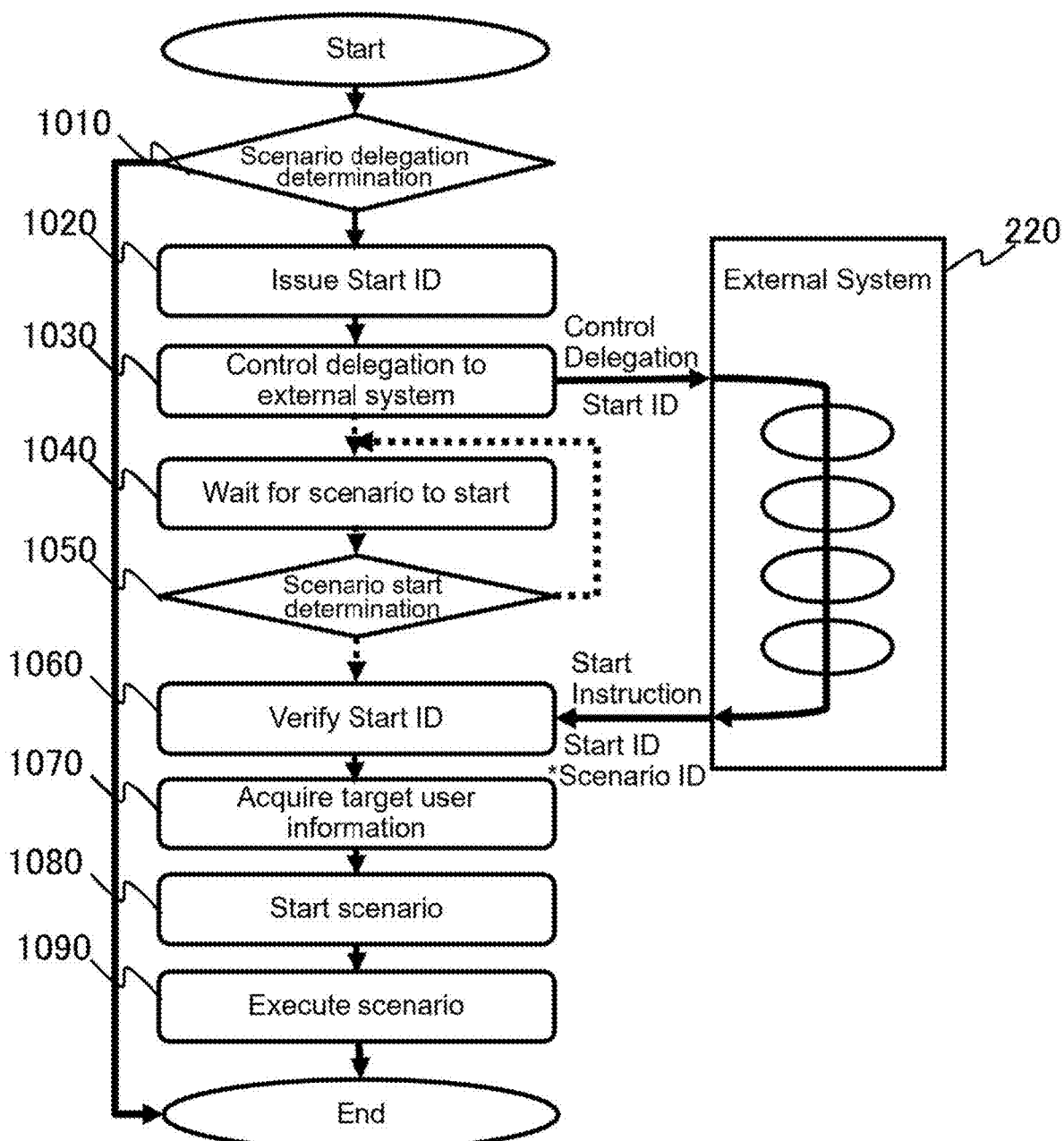
FIG. 10 is a diagram illustrating an example of a chat session control delegation process according to the embodiments of the present invention.

FIG. 10 is a diagram illustrating an example of a chat session control delegation process 1000 according to the embodiments of the present invention. As described above, in one aspect of the present invention, the processing of a chat scenario according to the embodiments of the present invention can be delegated to a predetermined external system. This chat session control delegation processing is effective, for example, in cases where information is acquired from a user in a chat scenario, some processing is performed in the external system based on the information, and the result of the processing is returned to the scenario. In this way, when the processing time of the external system is long, for example, by delegating the control of the chat scenario to the external system, it is possible to avoid information loss due to the expiration of the chat session or the like.

It should be noted that the chat session control delegation process 1000 illustrated in FIG. 10 may be performed by the scenario delegation management unit 250 illustrated in FIG. 2, for example.

The chat session control delegation process 1000 may be initiated, for example, based on scenario delegation trigger information that triggers delegation of a chat scenario to the external system 220. The scenario delegation trigger information may be, for example, information indicating that processing in the external system 220 is necessary, information indicating that the dialogue state of the chat scenario matches a predetermined dialogue state, or the like. The scenario delegation trigger information may be transferred to the scenario delegation management unit from, for example, a chat bot that is currently being executed.

First, at Step 1010, it is determined whether or not scenario control delegation to a predetermined external system 220 is possible. This determination may be made based on the status of the available computing resources of the external system 220, the processing currently being executed on the external system 220, or the like. For example, if it is determined that a chat scenario satisfying a predetermined similarity criterion with respect to the delegation target scenario (for example, the same chat scenario) is already being executed on the external system 220, the delegation may be stopped. On the other hand, if a chat scenario satisfying a predetermined similarity criterion with respect to the delegation target scenario is not already being executed on the external system 220, the delegation process may proceed, and the process may proceed to Step 1020.

Next, at Step 1020, a start ID may be issued to initiate the delegation target chat scenario. The start ID may be, for example, dedicated unique key information (such as a character string). In addition, this start ID also includes information of the user interacting with the chat bot in the target chat scenario, and this user information can be used at the time of initiation of the scenario to seamlessly migrate the dialogue.

Next, at Step 1030, the start ID of the delegation target chat scenario and the control of the chat scenario (a dedicated API for controlling the scenario, authorization, and the like) are delegated to the external system 220. Delegation of control may be accomplished, for example, by execution of the API of the external system 220 or by registration of data in the database of the external system 220.

Next, at Step 1040, the scenario delegation management unit waits for a scenario start request from the external system 220. This scenario start request is information that includes the start ID issued in Step 1020 and requests authorization to initiate a chat scenario. In addition, the scenario start request may be made via an API for starting the external system 220, for example. Alternatively, the scenario delegation management unit may periodically monitor the state of the external system 220 (the processes being executed, available computing resources and the like) and start the scenario when the state of the external system 220 reaches a predetermined state (such as when sufficient computing resources become available).

It should be noted that, although the above description has been made based on the assumption that the chat scenario for which control is to be delegated to the external system 220 has been determined in advance, the present invention is not limited thereto, and the external system 220 itself may select a desired chat scenario from a plurality of available chat scenarios. In this case, the external system 220 may send a scenario ID that identifies the desired chat scenario along with the start ID as the scenario start request.

Next, at Step 1050, in the case that the scenario delegation management unit determines that a scenario start request has been received from the external system 220, the processing proceeds to Step 1060. In addition, in the case that the scenario delegation management unit determines that a scenario start request has not been received from the external system 220 (for example, within a predetermined time such as 1 minute, 5 minutes, or 1 hour), the scenario delegation management unit may return to Step 1040 and continue waiting, or may stop the delegation processing.

Next, at Step 1060, the scenario delegation management unit determines whether or not the start ID included in the received scenario start request matches the start ID issued to the external system 220 in Step 1020. In the case that the scenario delegation management unit determines that the start ID from the external system matches the start ID issued to the external system 220 in Step 1020, the processing proceeds to Step 1070. In the case that the scenario delegation management unit determines that the start ID from the external system does not match the start ID issued to the external system 220 in Step 1020, the processing terminates.

Next, at Step 1070, the scenario delegation management unit acquires the information of the user who started the scenario (the user having a dialogue with the chat bot in the scenario) based on the start ID included in the received scenario start request from the slot defined in the chat scenario, for example, and transmits the acquired information to the external system 220. This information may be, for example, information entered by a user in the dialogue, information specifying a desired service, or the like.

Next, at Step 1080, the scenario delegation management unit causes the external system 220 to start the delegation target chat scenario. Here, the scenario delegation management unit may transmit, for example, information for permitting the start of the scenario to the external system 220.

Next, at Step 1090, the external system 220 executes the delegation target chat scenario with respect to the user corresponding to the user information acquired in Step 1070.

It should be noted that when the processing of the chat scenario is completed, the control of the delegated scenario is returned from the external system 220 to the chat bot control device (for example, the chat bot control device 230 illustrated in FIG. 2).

As described above, the chat bot control device according to the embodiments of the present invention can delegate control of a specific chat scenario to a predetermined external system. In this way, in a case in which some processing (a hearing in a personnel hiring or the like) with respect to the user interacting with the chat bot is performed within the external system, or in a case in which the service requested by the user is directly provided by the external system (hotel reservation or the like), by delegating control of the chat scenario to the external system, it is possible to respond more efficiently to the needs of the user.

Next, a specific example of a case in which the chat session control technique according to the embodiments of the present invention is applied to facility reservation will be described with reference to FIG. 11.

Figure 11:
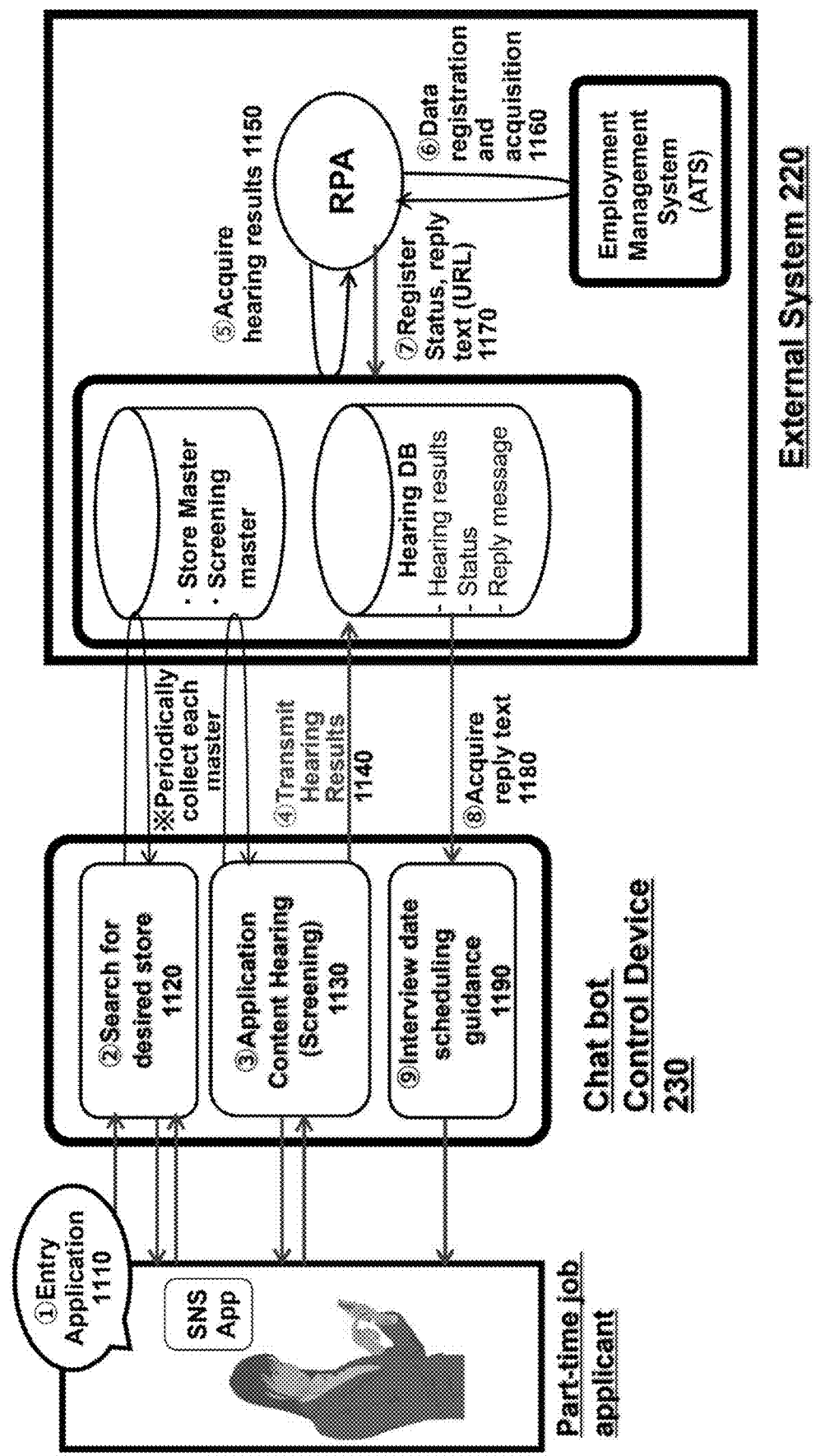
FIG. 11 is a diagram illustrating a specific example of a case in which the chat session control technique according to the embodiments of the present invention is applied to facility reservation.

FIG. 11 is a diagram illustrating a specific example 1100 of a case in which the chat session control technique according to the embodiments of the present invention is applied to facility reservation. As described above, the chat scenario generation process according to the embodiments of the present invention can be applied to various fields, and examples thereof may include facility reservation for a rental conference room, a public organization, or an event.

This corresponds to a situation where a hearing is conducted with a user who wishes to reserve a facility (in order to confirm the purpose of use or the like) through interaction with a chat bot, and users who pass the hearing can make a reservation of a facility, for example.

First, at Step 1110, a user who is applying for a facility reservation starts a dialogue with a chat bot via a predetermined SNS tool, and transmits a reservation application to the chat bot control device 230. The reservation application here may include, for example, a message composed of natural language such as "I'm looking for a conference room" or "I want to play tennis." In addition, the entry application may also include information specifying the conditions that the user is looking for (content, number of people, purpose of use, reservation time or the like).

Next, at Step 1120, the chat bot control device 230 searches for a facility satisfying the desired conditions of the reservation application received in Step 1110. Here, the chat bot control device 230 may perform the search with respect to a database (for example, a facility master) stored in the external system 220. The retrieved facility information is then sent to the user, and the user selects a desired facility and sends it back to the chat bot control device 230.

Next, at Step 1130, the chat bot control device 230 acquires the content of the reservation (the number of people, purpose of use, desired time, and use qualifications) from the user, and performs a hearing (examination) using a hearing criterion acquired from the database (for example, a hearing master) of the external system 220. In the case that the result of the hearing is a pass, the process proceeds to Step 1140, and in the case that the result of the hearing is a failure, the processing terminates.

It should be noted that here, the chat bot control device 230 may dynamically generate a chat scenario for acquiring the reservation content based on the facility selected by the user in accordance with the chat scenario generation process according to the embodiments of the present invention. This chat scenario may be generated, for example, based on information acquired from the database of the external system.

Next, at Step 1140, the chat bot control device 230 transmits the result of the hearing performed in Step 1130 to the external system 220. Next, at Step 1150, the external system 220 obtains the results of the hearing.

Next, at Step 1160, the information of the user who passed is registered in the reservation management system of the external system 220 by, for example, a predetermined Robotics Process Automation method. In addition, here, the reply message to be sent to the user may be acquired from the reservation management system.

Next, at Step 1170, the result of the hearing, the status of the user (pass, acceptance, additional hearing or the like) and the reply message to be sent to the user (a URL for adjusting the reservation schedule of the facility) are registered in the hearing database of the external system 220. Further, at Step 1180, the external system 220 transmits the result of the hearing, the status of the user and the reply message to be sent to the user to the chat bot control device 230.

Next, at Step 1190, the chat bot control device 230 transmits the result of the hearing acquired from the external system 220, the status of the user and the reply message to be sent to the user to the user, and guides the user to adjust the reservation schedule of the facility.

In this way, by dynamically generating chat scenarios based on the latest information of the external system 220 (facility information, conditions of the recruiting facility) and providing them to the user in real time, it becomes unnecessary to generate a different chat scenario for each facility in advance, and it is no longer necessary to update the chat scenario each time the circumstances of the facility change. For this reason, in addition to being able to save the labor of manually developing the scenarios, it is also possible to assist the user more quickly and flexibly.

Next, an example of interaction with a chat bot when the chat session control technique according to the embodiments of the present invention is applied to facility reservation will be described with reference to FIG. 12.

Figure 12:
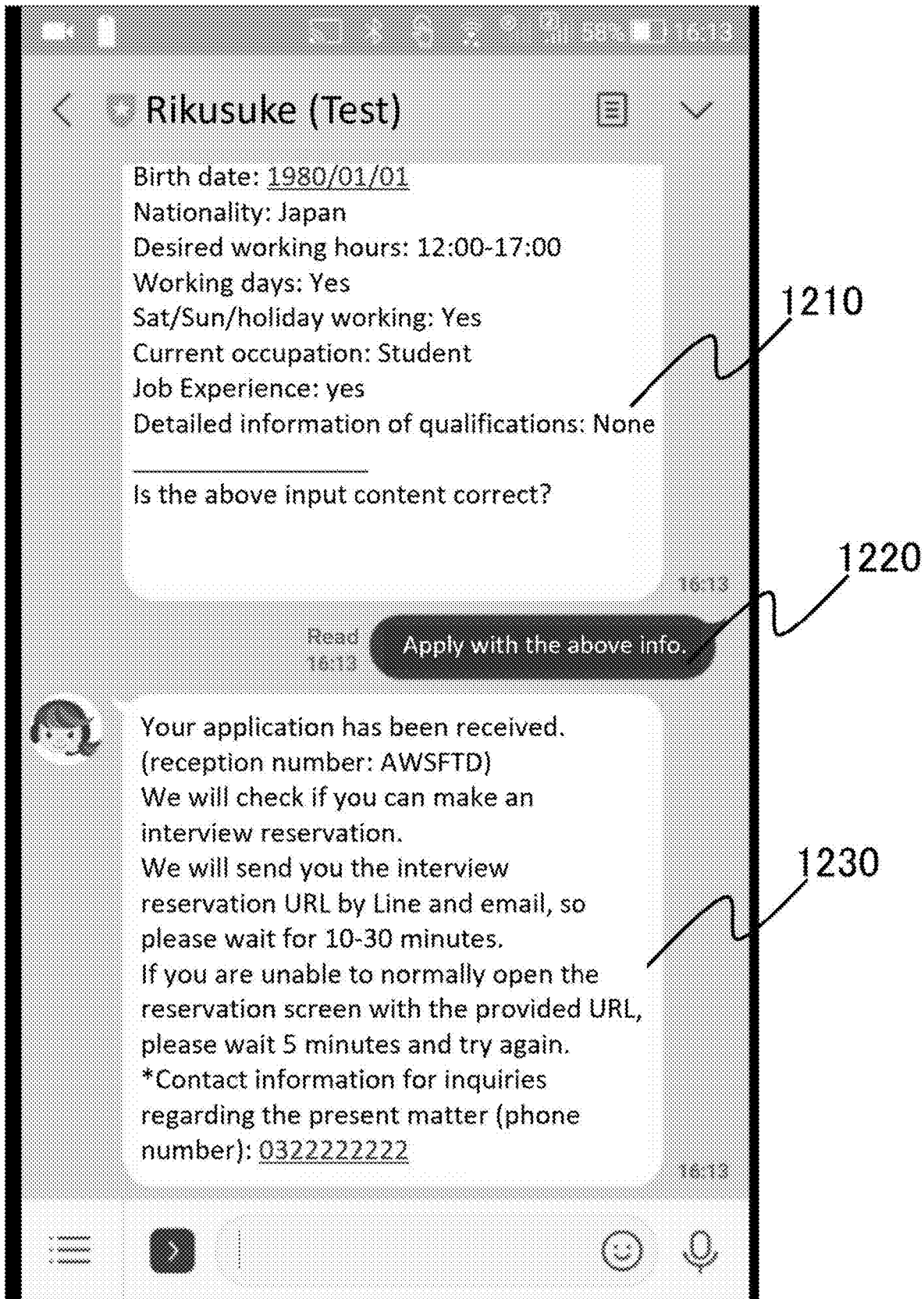
FIG. 12 is a diagram illustrating an example of interaction with a chat bot when the chat session control technique according to the embodiments of the present invention is applied to facility reservation.

FIG. 12 is a diagram illustrating an example of a screen of a dialogue 1200 in a chat session between a user and a chat bot when the chat session control technique according to the embodiments of the present invention is applied to facility reservation.

As illustrated in FIG. 12, the dialogue 1200 between the user and the chat bot includes a first utterance 1210 from the chat bot, an utterance 1220 from the user, and a second utterance 1230 from the chat bot.

In the first utterance 1210 from the chat bot, the chat bot sends a prompt utterance so that the user can confirm the information acquired from the user in the dialogue so far (not shown). This information may include, for example, confirmation of the user's desired facility, purpose of use, number of people, use qualifications, and the like, as illustrated in FIG. 12.

It should be noted that the chat scenario for acquiring the information from the user may be, for example, a scenario dynamically generated based on the chat scenario generation processing described above.

The user who receives the first utterance 1210 from the chat bot sends, as the utterance 1220 from the user, a message to the chat bot to confirm the content.

Subsequently, the chat bot starts the scenario delegation control described above in order to conduct a hearing for examining the information received from the user (the reservation contents or the like), and transmits, as the second utterance 1230 from the chat bot, a message instructing the user to wait.

As described above, in the scenario delegation control, the information received from the user (such as the reservation content or the like) is transmitted to a predetermined external system, and the control of the scenario is delegated to this external system. After the hearing by the external system has completed, the scenario delegation control session terminates, and control of the scenario is returned to the chat bot control device.

As described above, by using the chat scenario dynamic generation process and the scenario control delegation process according to the embodiments of the present invention, it is possible to provide chat scenarios based on the latest data in real time, and to assist users more flexibly and efficiently.

While embodiments of the present invention have been described above, the present invention is not limited to the above-described embodiments, and various changes can be made without departing from the gist of the present invention.

REFERENCE SIGNS LIST

200 Chat bot control system
210 Mobile device
212 Bus
215 Communication network
220 External system
231 Processor
232 I/O interface
233 Network Interface
234 User I/O Interface
235 Storage Unit
240 Memory
242 External data acquisition unit
244 Scenario generation unit
246 Scenario execution unit
248 Scenario conversion success determination unit
250 Scenario delegation management unit

The invention claimed is:

1. A chat bot control device comprising:
an external data acquisition unit for acquiring, in a chat session between a user and a chat bot, chat scenario creation data for generating a chat scenario from a predetermined external system based on a first input from the user;
a scenario generation unit for generating, based on the chat scenario creation data, a first chat scenario that specifies a transition of a dialogue between the user and the chat bot using predetermined scenario conversion logic that defines a chat scenario generation pattern; and
a scenario execution unit for executing the first chat scenario in the chat session,
wherein:
the chat bot control device further comprises a scenario delegation management unit for managing delegation of a specific chat scenario included in the chat session to the external system; and
in response to receiving scenario delegation trigger information that triggers delegation of the specific chat scenario to the external system, the scenario delegation management unit:
determines whether or not a chat scenario that satisfies a predetermined similarity criterion with respect to the specific chat scenario is already being executed in the external system,
transmits, in a case that it is determined that a chat scenario that meets a predetermined similarity criterion with respect to the specific chat scenario is not already being executed in the external system, a start ID for starting the specific chat scenario to the external system; and
transmits, in response to receiving a start requesting including the start ID from the external system, information related to the specific chat scenario that corresponds to the start ID to the external system and starts execution of the specific chat scenario.

2. The chat bot control device according to claim 1, wherein:
the chat session includes:
a main scenario that is a static scenario called at startup, and
a sub-scenario executed within the main scenario; and
the first chat scenario is executed as a sub-scenario within the main scenario.

3. The chat bot control device according to claim 2, wherein the scenario generation unit:
generates a second definition structure based on the chat scenario creation data by mapping the chat scenario creation data acquired from the external system to a first definition structure created in advance based on a use case that corresponds to the chat scenario; and
generates the first chat scenario by executing the second definition structure as a computer program.

4. The chat bot control device according to claim 3, wherein the scenario generation unit:
generates the second definition structure by converting the chat scenario creation data acquired from the external system to a definition structure based on a predetermined method for defining transition rules in the chat session.

5. The chat bot control device according to claim 1, wherein:
the first chat scenario is stored in the external system;
the external data acquisition unit acquires the first chat scenario from the external system; and
the scenario execution unit executes the first chat scenario obtained from the external system in the chat session.

6. The chat bot control device according to claim 1, wherein the external data acquisition unit acquires the chat scenario creation data from the external system using a Robotics Process Automation technique.

7. The chat bot control device according to claim 1, wherein:
the chat bot control device further comprises a scenario conversion success determination unit for determining whether or not chat scenario generation has succeeded; and
the scenario conversion success determination unit:
compares the first chat scenario with success determination data that specifies a definition structure corresponding to the chat bot control device,
determines, in a case that the first chat scenario satisfies a predetermined similarity criterion with respect to the success determination data, that generation of the first chat scenario is successful, and transfers the first chat scenario to the scenario execution unit; and
determines, in a case that the first chat scenario does not satisfy a predetermined similarity criterion with respect to the success determination data, that generation of the first chat scenario is not successful, and provides an error message indicating that generation of the first chat scenario is not successful to a predetermined notification destination.

8. The chat bot control device according to claim 1, wherein the start request includes, together with the start ID, a scenario ID that identifies the specific chat scenario from among a plurality of available chat scenarios.

9. A chat bot control method comprising:
a step for acquiring, in a chat session between a user and a chat bot, chat scenario creation data for generating a chat scenario from a predetermined external system based on a first input from the user;
a step for generating, based on the chat scenario creation data, a first chat scenario that specifies a transition of a dialogue between the user and the chat bot using predetermined scenario conversion logic that defines a chat scenario generation pattern; and
a step for executing the first chat scenario in the chat session,
wherein:
the chat bot control method further comprises a step for managing delegation of a specific chat scenario included in the chat session to the external system; and
in response to receiving scenario delegation trigger information that triggers delegation of the specific chat scenario to the external system, the step for managing delegation includes:
determining whether or not a chat scenario that satisfies a predetermined similarity criterion with respect to the specific chat scenario is already being executed in the external system,
transmitting, in a case that it is determined that a chat scenario that meets a predetermined similarity criterion with respect to the specific chat scenario is not already being executed in the external system, a start ID for starting the specific chat scenario to the external system; and
transmitting, in response to receiving a start requesting including the start ID from the external system, information related to the specific chat scenario that corresponds to the start ID to the external system and starts execution of the specific chat scenario.

10. A chat bot control system in which a mobile device used by a user, a chat bot control device for providing a chat session for the user and a chat bot to interact with each other, and an external system for storing chat scenario creation data are connected via a communication network, wherein:

the chat bot control system includes:
an external data acquisition unit for acquiring, in the chat session between the user and the chat bot, chat scenario creation data for generating a chat scenario from a predetermined external system based on a first input from the user via the mobile device;
a scenario generation unit for generating, based on the chat scenario creation data, a first chat scenario that specifies a transition of a dialogue between the user and the chat bot using predetermined scenario conversion logic that defines a chat scenario generation pattern; and
a scenario execution unit for executing the first chat scenario in the chat session,
wherein:
the chat bot control system further comprises a scenario delegation management unit for managing delegation of a specific chat scenario included in the chat session to the external system; and
in response to receiving scenario delegation trigger information that triggers delegation of the specific chat scenario to the external system, the scenario delegation management unit:
determines whether or not a chat scenario that satisfies a predetermined similarity criterion with respect to the specific chat scenario is already being executed in the external system,
transmits, in a case that it is determined that a chat scenario that meets a predetermined similarity criterion with respect to the specific chat scenario is not already being executed in the external system, a start ID for starting the specific chat scenario to the external system; and
transmits, in response to receiving a start requesting including the start ID from the external system, information related to the specific chat scenario that corresponds to the start ID to the external system and starts execution of the specific chat scenario.

* * * * *